US007856646B1

(12) United States Patent
Groff et al.

(10) Patent No.: US 7,856,646 B1
(45) Date of Patent: Dec. 21, 2010

(54) PREPARATION AND UTILIZATION OF CUSTOMER PROFILE DATA IN A CABLE SERVICES NETWORK

(75) Inventors: Vincent Groff, Dunwoody, GA (US); Steve Calzone, Duluth, GA (US); John Kelly King, Asheville, NC (US); Bruce Beeco, Buford, GA (US)

(73) Assignee: Cox Communications, Inc., Atlanta, GA (US)

( * ) Notice: Subject to any disclaimer, the term of this patent is extended or adjusted under 35 U.S.C. 154(b) by 1715 days.

(21) Appl. No.: 10/885,292

(22) Filed: Jul. 2, 2004

(51) Int. Cl.
*H04N 5/445* (2006.01)
*H04N 7/025* (2006.01)
*G06F 3/00* (2006.01)
(52) U.S. Cl. .............................. 725/42; 725/34; 725/60
(58) Field of Classification Search ................... 725/34, 725/42, 46
See application file for complete search history.

(56) References Cited

U.S. PATENT DOCUMENTS

| | | | | |
|---|---|---|---|---|
| 5,815,195 | A * | 9/1998 | Tam ............................ | 725/86 |
| 6,177,931 | B1 * | 1/2001 | Alexander et al. ............ | 725/52 |
| 6,275,268 | B1 | 8/2001 | Ellis et al. .................... | 348/564 |
| 6,438,596 | B1 | 8/2002 | Ueno et al. ................... | 709/226 |
| 6,639,975 | B1 | 10/2003 | O'Neal et al. ............ | 379/112.01 |
| 6,718,551 | B1 * | 4/2004 | Swix et al. ..................... | 725/32 |
| 7,076,544 | B2 | 7/2006 | Katz et al. ................... | 709/223 |
| 7,114,170 | B2 * | 9/2006 | Harris et al. ................... | 725/34 |
| 7,428,503 | B1 | 9/2008 | Groff et al. ................... | 705/26 |
| 2001/0014975 | A1 | 8/2001 | Gordon et al. ............... | 725/91 |
| 2002/0049624 | A1 | 4/2002 | Raveis, Jr. ..................... | 705/8 |
| 2002/0049977 | A1 | 4/2002 | Miller et al. ................... | 725/82 |
| 2002/0059602 | A1 * | 5/2002 | Macrae et al. ................ | 725/42 |
| 2002/0069420 | A1 | 6/2002 | Russell et al. ................. | 725/92 |
| 2002/0078453 | A1 * | 6/2002 | Kuo ............................ | 725/46 |
| 2002/0129375 | A1 | 9/2002 | Kim et al. ..................... | 725/100 |
| 2002/0169656 | A1 | 11/2002 | Al-Azzawe .................. | 705/10 |
| 2003/0046700 | A1 | 3/2003 | Wilcox et al. ................ | 725/60 |
| 2003/0084449 | A1 * | 5/2003 | Chane et al. .................. | 725/46 |
| 2003/0200159 | A1 | 10/2003 | Kay et al. ..................... | 705/28 |

(Continued)

OTHER PUBLICATIONS

U.S. Office Action dated Aug. 20, 2007 cited in U.S. Appl. No. 11/002,913.

(Continued)

*Primary Examiner*—John W Miller
*Assistant Examiner*—Chris Parry
(74) *Attorney, Agent, or Firm*—Merchant & Gould

(57) ABSTRACT

Methods and systems for preparing, updating and maintaining customer profile data that may be utilized in an interactive television system for providing tailored customer-specific interactive services, and product offerings and helpful information content. The customer's set-top box queries an application server for profile data corresponding to the customer. A web services system queries each of a number of data services associated with the interactive television services provider to obtain profile data for the customer. Available customer data is passed to the application server. The application server prepares a customer profile from the customer data and formats the customer profile for use by the client-side set-top box. After the customer profile is stored at the set-top box, customer-specific services and product offerings may be presented to the customer in the form of targeted advertising, and customer-specific information content may be presented to the customer.

20 Claims, 5 Drawing Sheets

U.S. PATENT DOCUMENTS

| | | | |
|---|---|---|---|
| 2003/0229898 A1* | 12/2003 | Babu et al. | 725/87 |
| 2004/0187159 A1 | 9/2004 | Gaydos et al. | 725/92 |
| 2005/0160458 A1* | 7/2005 | Baumgartner | 725/46 |
| 2005/0172325 A1 | 8/2005 | Henry et al. | 725/116 |
| 2005/0256952 A1 | 11/2005 | Mouhanna et al. | 709/223 |
| 2006/0248555 A1* | 11/2006 | Eldering | 725/34 |
| 2006/0293971 A1 | 12/2006 | Hunter et al. | 705/26 |

OTHER PUBLICATIONS

U.S. Notice of Allowance and Fees Due dated Mar. 18, 2008, cited in U.S. Appl. No. 11/002,913.

U.S. Appl. No. 11/035,678, filed Jan. 13, 2005, entitled "Intelligent Asset Management in a Cable Services System".

U.S. Appl. No. 11/022,912, filed Dec. 2, 2004, entitled Customer Support Services via a Cable Services Network.

U.S. Office Action dated Aug. 5, 2008 cited in U.S. Appl. No. 11/035,678.

U.S. Office Action dated Nov. 13, 2008 cited in U.S. Appl. No. 11/002,912.

U.S. Final Office Action dated Mar. 30, 2009 cited in U.S. Appl. No. 11/035,678.

U.S. Office Action dated Sep. 15, 2009 cited in U.S. Appl. No. 11/035,678.

Notice of Allowance mailed Jul. 30. 2010, in co-pending U.S. Appl. No. 11/035,678.

* cited by examiner

| CUSTOMER PROFILE 200 | | |
|---|---|---|
| 205 NAME: | JOHN DOE | |
| 210 ADDRESS: | 123 MAIN STREET | |
| 215 TELEPHONE #: | 555-1234 | |
| 220 EMAIL: | CUSTOMER@SVC.COM | |
| 225 AGE: | 28 | |
| 230 GENDER: | MALE | |
| 240 SUBSCRIPTION INFO | | |
| 250 HIGH SPEED INTERNET | Y | N |
| 255 EMAIL | Y | N |
| 260 PREMIUM PROGRAMMING | Y | N |
| 265 TELEPHONE CUSTOMER | Y | N |
| 270 OTHER SERVICES | Y | N |

Fig. 2

PREPARATION AND UTILIZATION OF CUSTOMER PROFILE DATA IN A CABLE SERVICES NETWORK

FIELD OF THE INVENTION

This present invention generally relates to preparation and utilization of customer profile data in a cable services network. More particularly, the present invention relates to preparation and utilization of customer profile data for providing customer-specific services and product offerings and customer-specific information content through a cable services network.

BACKGROUND OF THE INVENTION

With the advent of cable television networks, cable customers have grown accustomed to receiving a variety of television programming from numerous broadcasting sources. In recent years, technology advances have enabled customers to receive an even greater variety of services through cable services networks. Modern cable services networks provide traditional video television programming, telephone services, high speed Internet access, electronic mail services, video-on-demand, information services, and the like. Through the use of set-top boxes (computing systems) cable services providers can provide interactive television services to customers. Such interactive television services allow customers to interact directly with services providers in response to services and product offerings presented to the customers through their personal television sets.

In a typical setting, a cable television channel may be utilized by a cable services provider for providing an interactive menu through which a subscriber may order and update services and products and through which a customer may receive valuable information content such as services or product offerings, local weather updates, traffic information, news flashes, and the like. However, because individual customers subscribe to many different combinations of services and products and because customers are physically geographically disbursed, it is often difficult to provide a particular customer with services and/or product offerings or valuable information content that is particularly useful to the individual customer as compared to other customers.

Accordingly, there is a need in the art for methods and systems for preparing and maintaining customer profiles that may be utilized by an interactive television system for tailoring interactive services, services and product offerings and helpful information content provision to given customers. It is with respect to these and other considerations that the present invention has been made.

SUMMARY OF THE INVENTION

Embodiments of the present invention solve the above and other problems by providing methods and systems for preparing, updating and maintaining customer profile data that may be utilized in an interactive television system for providing tailored customer-specific interactive services, services and product offerings and helpful information content. According to an interactive television system of the present invention, a cable television services customer may interact with services and products providers through her personal television set via a set-top box. The set-top box controls and facilitates the presentation of video programming and data to the customer's television set. Additionally, the set-top box serves as a client-side computing platform for allowing the customer to send and receive data to and from a server-side computing system operated by the customer's interactive television services provider.

When the customer boots or initializes her set-top box for the first time, or after the elapse of a set amount of time, the customer's set-top box queries an application server at the server-side computing system of her interactive television services provider for profile data corresponding to the customer. The query from the set-top box to the application server includes identification information for the requesting set-top box. In response to receipt of the query from the set-top box, the application server populates a data query with the set-top box identification information and passes the data query to a web services system along with a request for profile data for the customer associated with the identified set-top box.

In response to the data query from the application server, the web services system formulates a data query to each of a number of data services associated with the interactive television services provider to obtain profile data for the customer. According to one aspect of the invention, the web services system is operative to communicate with disparate data services systems according to communications protocols required by each individual data services system. For example, an interactive television services provider billing system may be queried for name, address, telephone number, business identification number, Social Security number, credit history, services and products subscription data, and the like for the customer. For another example, a services provider electronic mail system may be queried for electronic mail services subscription data for the customer, including electronic mail address, if any. A customer services database may be queried for information regarding services and products currently subscribed to by the customer. Advantageously, any system maintained by or associated with the interactive television services provider may be queried for available data for the customer.

After the web services system receives responses to all data queries, available customer data is passed by the web services system back to the application server. The application server prepares a customer profile from the customer data and formats the customer profile for use by the client-side set-top box. The customer profile is then passed to the set-top box associated with the customer's television set and is stored by the set-top box. If customer data is not received by the web services system in response to data queries to the data services systems, the application server prepares a default customer profile from most recently available customer data. If no recently available customer data is available, the application server prepares a default customer profile without customer-specific data. The default customer profile is passed to the customer's set-top box and is stored by the set-top box.

According to another aspect of the invention, after the elapse of a defined period of time, for example 24 hours, during which a given customer profile has not been updated, the set-top box queries the application server for a refresh of the customer profile. In order to refresh the customer profile, the application server again queries the web services system, and the web services system again queries one or more data services systems for customer data that may be used by the application server to update the customer profile.

After the customer profile is stored at the set-top box, customer-specific information content may be presented to the customer, and customer-specific services and product offerings may be presented to the customer in the form of targeted advertising. The customer may select a menu function to commence an interactive services session with the customer's services provider via the customer's set-top box. Once the interactive services menu is launched and is displayed on the customer's television set, the customer profile stored by the set-top box may be used to provide services and product offerings to the customer via the displayed menu. For example, if a customer profile indicates that the customer is not a subscriber to high speed Internet access, an advertisement may be displayed to the customer offering that service. For another example, if the customer profile contains a street address for the customer at which a new service is now available, an advertisement may be displayed to the customer offering the new service. Similarly, information content may be tailored to the customer profile for provision to the customer. For example, local weather keyed to the customer's street address and/or ZIP code may be obtained and displayed to the customer.

These and other features and advantages, which character the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIG. 2 is a simplified block diagram illustrating a customer profile data structure for providing customer profile data to a set-top box according to embodiments of the present invention.

DETAILED DESCRIPTION

Figure 1:
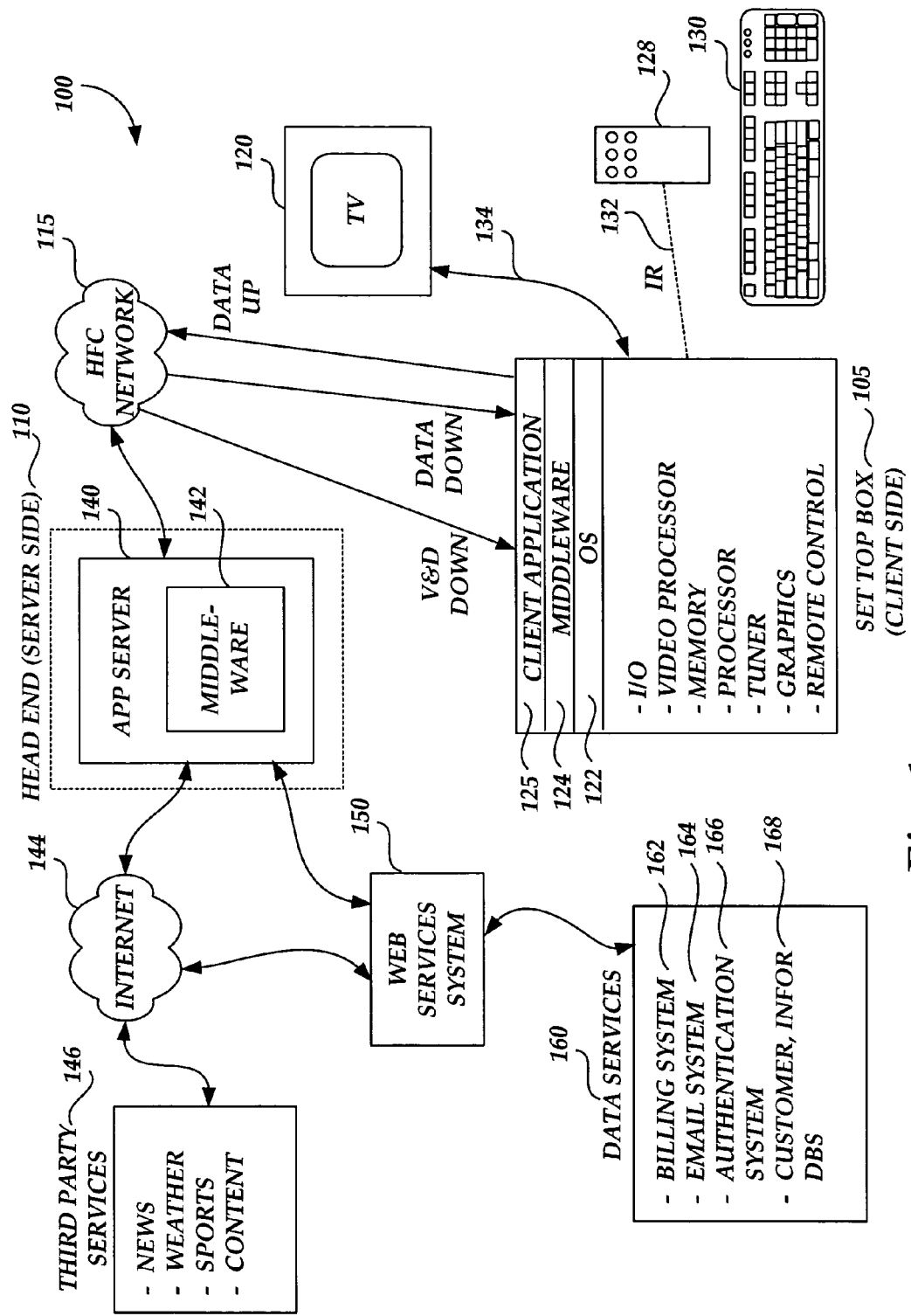
FIG. 1 is a simplified block diagram illustrating a cable services network architecture that serves as an exemplary operating environment for the present invention.

As briefly described above, embodiments of the present invention are directed to methods and systems for preparing, updating and maintaining customer profile data for providing interactive services, services and product offerings and information content that is tailored to a specific customer based on profile data for the customer. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents. Referring now to the drawings, in which like numerals refer to like elements throughout the several figures, aspects of the present invention and an exemplary operating environment will be described.

Operating Environment

Embodiments of the present invention may be implemented in a number of distributed computing environments where functionality is tailored for provision to a given user based on a user profile obtained by polling data sources having data associated with the user. According to an actual embodiment, the present invention is implemented in a cable television/services system. FIG. 1 is a simplified block diagram illustrating a cable television/services system (hereafter referred to as "CATV") architecture that serves as an exemplary operating environment for the present invention.

Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105. According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 obtains customer profile data from services provider data services 160 for preparing a customer profile that may be utilized by the set-top box 105 for tailoring certain content provided to the customer. As illustrated in FIG. 1, the services provider data services 160 include a number of services operated by the services provider of the CATV system 100 which may include data on a given customer. For example, a billing system 162 may include information such as a customer's name, street address, business identification number, Social Security number, credit history, and information regarding services and products subscribed to by the customer. An electronic mail system 164 may contain information such as electronic mail addresses, high-speed Internet access subscription information and electronic mail usage data. An authentication system 166 may include information such as secure user names and passwords utilized by customers for access to network services. The customer information database 168 may include general information about customers such as place of employment, business address, business telephone number and demographic information such as age, gender, educational level, and the like. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. When the application server 140 requires customer profile data from one or more of the data services 160 for preparation or update of a customer profile, the application server 140 passes a data query to the web services system 150. The web services system formulates a data query to each of the available data services systems for obtaining any available data for a given customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer profile data. The customer profile data obtained by the web services system is assembled and is returned to the application server 140 for ultimate processing via the middleware layer 142, as described above.

Operation

Having described an exemplary operating environment for embodiments of the present invention with reference to FIG. 1, preparation and utilization of a customer profile will now be described. FIG. 2 is a simplified block diagram illustrating a customer profile data structure for providing customer profile data to a set-top box according to embodiments of the present invention. As described above, once the web services system 150 assembles required customer data, the customer data is passed back to the application server 140 where a customer profile 200 is prepared for transmission to the client-side set-top box 105 via the HFC network 115. The customer profile 200, illustrated in FIG. 2, is for purposes of example only. As should be appreciated by those skilled in the art, the customer profile may contain a variety of different types of information about a given customer that may be useful for targeted advertising Wand targeted content provision for the customer via the set-top box 105.

Referring to the customer profile 200, information gathered by the web services system 150 from one or more of the data services systems 160 is assembled into a data structure for provision to the set-top box 105. As illustrated in FIG. 2, a name 205, address 210, telephone number 215, email address 220, age 225 and gender 230 for a given customer have been obtained and have been populated into the customer profile 200. As described above, such information may be gathered from any number of data services systems such as the billing system 162, the email system 164, the authentication system 166, or the customer information database 168. Additionally, following from the example customer profile 200, illustrated in FIG. 2, subscription information 240 for the associated customer has been obtained and has been populated into the customer profile. For example, information regarding services or products subscribed to by the customer is provided such as high-speed Internet subscription 250, email subscription 255, premium programming subscription 260, telephone customer services 265, or other services 270. Once the customer profile 200 is prepared by the application server 140, the customer profile may be formatted according to a formatting language such as the Extensible Markup Language and may be transmitted to the set-top box 105, as described herein.

Figure 3:
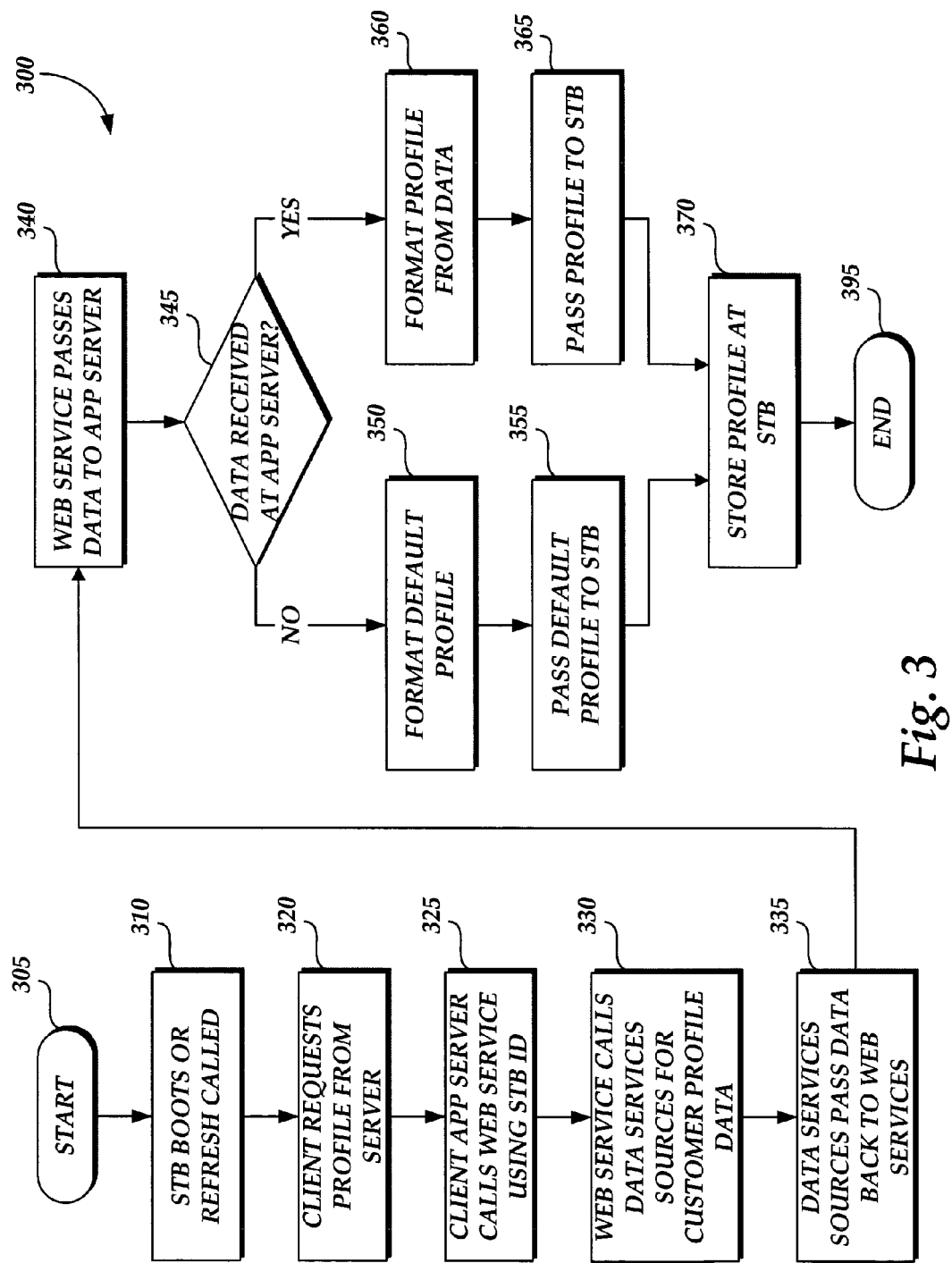
FIG. 3 is a flow diagram showing an illustrative routine for preparing and utilizing a customer profile in accordance with embodiments of the present invention.

FIG. 3 is a flow diagram showing an illustrative routine for preparing and utilizing a customer profile in accordance with embodiments of the present invention. For purposes of description of the routine illustrated in FIG. 3, consider, for example, that a customer profile is prepared by an application server 140 upon initialization (or booting) of the set-top box 105. The routine 300 begins at start block 305 and proceeds to block 310 where the set-top box is initialized or booted. As understood by those skilled in the art, the set-top box is initialized or booted when first installed, or after an unintentional or intentional loss of power, or when initialization is otherwise required. Alternatively, block 310 of the routine 300 is also applicable when a previous customer profile 200 requires a refresh because of the elapse of a specified amount of time since the last refresh or update of the profile 200. According to this alternative embodiment, after a given amount of time, for example 24 hours, a refresh of a previously prepared customer profile 200 is required to account for customer data that may have been updated during the elapsed period.

At block 320, the set-top box 105 sends a request via the HFC network 115 to the application server 140 for a customer profile 200 for a customer associated with the set-top box 105. According to embodiments of the present invention, the request message from the set-top box 105 to the application server 140 includes a set-top box identification number assigned to a given customer. At block 325, the application server 140 passes a data query including the set-top box identification to the web services system 150 requesting customer data associated with the customer associated with the identified set-top box. At block 330, the web services system 150 communicates with each of the disparate data services systems having customer data associated with the identified customer (set-top box). As described above, the web services system 150 is operative to communicate with each of the disparate data services systems according to communications paths and communications protocols required for each data services system. As should be appreciated, in some cases the application server may communicate directly with one or more data services where the application server is operative to understand the communications paths and protocols required by the one or more data services.

At block 335, the data services systems pass requested data back to the web services system 150. At block 340, the web services system accumulates the data and passes the data to the application server 140. At decision block 345, a determination is made as to whether data is received at the application server 140. As should be understood, if an error occurs, such as a web services communication error between the application server 140 and the web services system 150, no data may be returned from the web services system 150 to the application server 140. Alternatively, no data may be contained in any of the queried data services systems for the identified customer (set-top box), and consequently, no data may be accumulated by the web services system 150 for passing back to the application server 140. If data is not received by the application server 140, the routine proceeds to block 350, and a default customer profile is formatted by the application server 140. For example, the application server 140 may prepare a default customer profile 200 from previously obtained customer data associated with the identified set-top box 105. Alternatively, if no customer data is available for the identified set-top box 105, a default customer profile may be prepared by the application server 140 containing no particular information associated with customer of the set-top box 105. At block 355, the default customer profile is passed to the set-top box 105, and at block 370, the default customer profile is stored at the set-top box 105.

Referring back to decision block 345, if data is received at the application server 140, the routine proceeds to block 360, and the application server 140 prepares a customer profile 200, as illustrated above with reference to FIG. 2. According to embodiments of the present invention, the customer profile 200 may be formatted according to a formatting language such as the Extensible Markup Language. At block 365, the customer profile 200 prepared by the application server 140 is passed to the set-top box 105 via the HFC network 115. At block 370, the customer profile 200 is stored at the set-top box 105. The routine ends at block 395.

Figure 4:
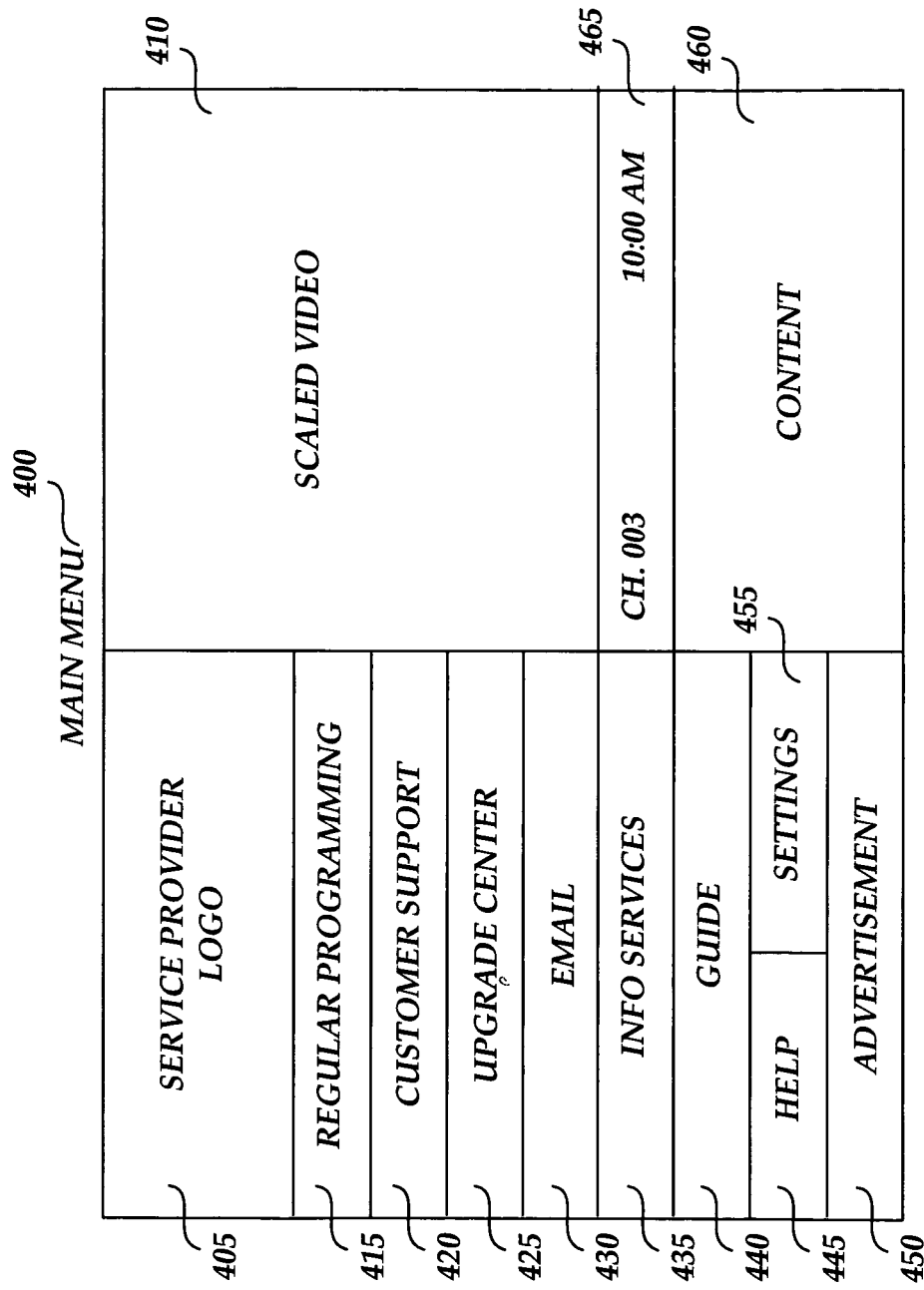
FIG. 4 is a simplified block diagram illustrating a television screen display of an interactive television services main menu according to embodiments of the present invention.

After the customer profile 200 has been prepared by the application server 140 and has been passed to the STB 105, the customer profile may then be utilized by the set-top box 105 for targeting advertising or otherwise providing customer specific content or services/product offerings to the customer via a client application 125. FIG. 4 is a simplified block diagram illustrating a television screen display of an interactive television services main menu according to embodiments of the present invention. Referring to FIG. 4, a client application 125 operating on the set-top box 105 may cause the presentation of a variety of menus that are displayed to the customer on the customer television 120. For example, the main menu 400 illustrated in FIG. 4 is representative of a first or main menu from which a customer may select other services provided by the customer's cable television services provider, or through which the customer may be provided targeted advertising and/or information content. As should be understood, the layout and content illustrated in FIG. 4 is for purposes of example only and is not limiting of the variety of different layouts and types of content that may be included in such a menu according to embodiments of the present invention.

The main menu television screen display 400 includes a service provider logo area 405 in the upper left-hand corner where the service provider may include their name, trademark or other identifying logo. A number of selectable buttons are provided with which the customer may select functionality from the main menu using the customer's remote control 128 or keyboard 130, illustrated in FIG. 1. For example, a regular programming button 415 is illustrated for allowing the user to dismiss the main menu screen and return to regular full-screen video programming. A customer support button 420 is provided for allowing the user to select a customer support application for obtaining information about services or products associated with the customer's cable television services subscription. An upgrade center button 425 is provided for allowing the user to launch a menu with which the user may upgrade or otherwise change subscribed services or products. An electronic mail button 430 is provided for allowing the user to launch an electronic mail session with which the user may review and dispose of electronic mail messages received via an electronic mail system operated by the customer's cable television services provider. A guide button 440 is provided for allowing the subscriber to receive helpful information such as television listings, services and product offerings, and the like. A help button 445 is provided for allowing the user to obtain helpful information regarding utilization of subscribed services. A settings button 455 is provided for allowing a user to check and modify subscribed services settings. A scaled video pane 410 is illustrated in which video programming is displayed while the user is viewing other portions of the main menu screen 400. For example, a television channel last viewed by the customer prior to selection of the main menu screen 400 may be identified in pane 465 and presented to the user in the scaled video pane 410 to prevent the user from missing desired portions of a video presentation.

An advertisement pane 450 provides a space for targeted advertisement directed to the customer in accordance with embodiments of the present invention. As described below with reference to FIG. 12, after the set-top box 105 receives the customer profile 200, the set-top box 105 may request and present to the user in the advertisement pane 450 targeted advertisement relative to customer data specific to a given customer. For example, if the customer profile 200 shows that a given customer has not subscribed to high speed Internet services, a targeted advertisement may be presented to the customer in the advertisement pane 450 promoting the high speed Internet service of the services provider. For another example, if the customer selects the electronic mail button 430 and the customer profile indicates the customer does not subscribe to electronic mail services, the customer may receive a targeted advertisement in the pane 450 offering electronic mail services. If no customer profile is prepared for a given customer, or if a default customer profile is prepared for the customer, the advertisement pane 450 may be populated with a default advertisement that is not specific to the customer of the main menu 400.

Referring still to FIG. 4, a content pane 460 is provided for displaying targeted content to a customer based on information contained in the customer profile. For example, weather information keyed to a customer's home address or ZIP code may be obtained from a third-party services system 146 and may be displayed in the content pane 460. For another example, traffic information regarding traffic routes between the customer's home address and the customer's office address may be provided in the content pane 460 prior to a morning rush hour period. As should be understood by those skilled in the art, a variety of targeted content may be displayed to a customer in the content pane 460. Alternatively, if no customer profile is prepared for a given customer, or if a default customer profile is prepared for a given customer, default information content may be displayed to the customer in the content pane 460.

Figure 5:
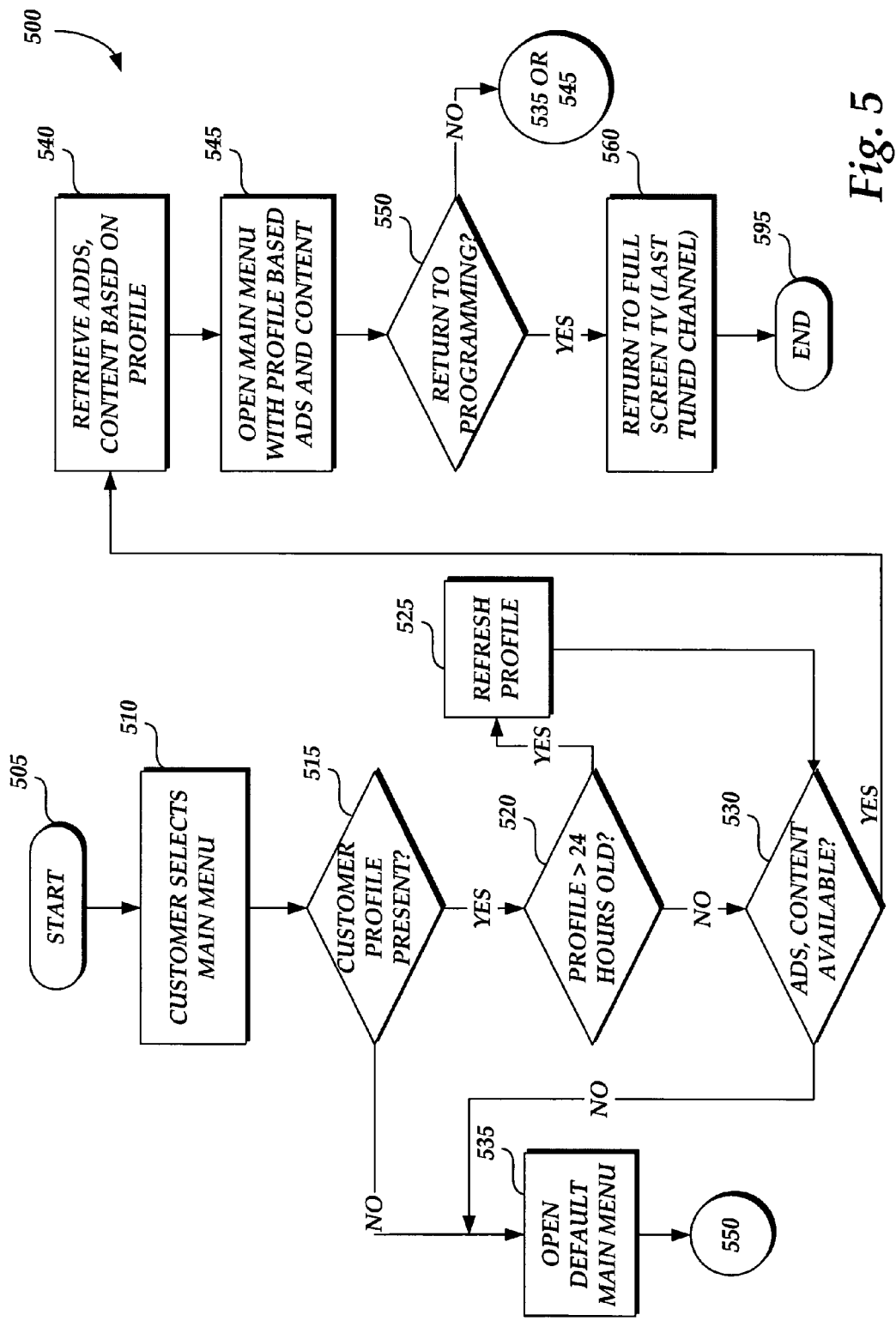
FIG. 5 is a flow diagram showing an illustrative routine for utilizing a customer profile for providing customer-specific services and product offerings and customer-specific information content according to embodiments of the present invention.

FIG. 5 is a flow diagram showing an illustrative routine for utilizing a customer profile for providing customer-specific services and product offerings and customer-specific information content according to embodiments of the present invention. The routine 500 begins at start block 505 and proceeds to block 510 where a customer selects the main menu 400 using the customer's remote control 128. At decision block 515, a determination is made at the set-top box 105 as to whether a customer profile is stored for the customer. If not, the routine proceeds to block 535, and a default main menu 400 is opened with default advertisement information in the advertisement pane 450 and default information content in the content pane 460. The routine proceeds to decision block 550, as described below.

Returning back to decision block 515, if a customer profile is stored at the STB 105, the routine proceeds to decision block 520, and a determination is made as to whether the customer profile has not been updated for a given period of time. For example, if the customer profile has not been updated during the last 24 hours, the routine proceeds to block 525, and the set-top box requests that the customer profile 200 be refreshed, as described above with reference to FIG. 3. At block 530, if the customer profile is not older than a defined period of time, or if the customer profile has been refreshed, the routine proceeds to block 530, and a determination is made as to whether targeted advertisements or targeted content is available for presentation to the customer in association with the customer profile. If neither targeted advertisements nor targeted content are available for presentation to the customer, the routine proceeds to block 535, as described above.

If targeted advertisement content and/or targeted information content is available, the routine proceeds to block 540, and the advertisement information and/or information content are retrieved by the set-top box 105 from the application server 140 based on the customer profile. Alternatively, the STB 105 may maintain advertisement information and information content in the local memory of the STB 105. At block 545, the set-top box 105 launches the main menu 400 and populates the advertisement pane 450 and content pane 460 with targeted advertisement information and targeted information content, as described above with reference to FIG. 4. At decision block 550, a determination is made as to whether the customer desires to return to regular programming. That is, a determination is made as to whether the customer has selected to dismiss the main menu 400 and return to viewing video programming. If not, the routine proceeds back to blocks 535 or 545, respectively, and the customer may continue to review the main menu display 400. If the customer decides to return to regular programming, the routine proceeds to block 560, and the main menu 400 is dismissed so that full-screen programming is restored to the customer's television 120. According to an embodiment of the present invention, the last channel being viewed by the customer prior to launching the main menu 400 is restored in full-screen display on the customer's television 120. The routine ends at block 595.

As described herein, methods and systems are provided for preparing, updating and utilizing a customer profile for providing targeted advertising and information content to a customer for alerting a customer to services and product offerings and available information content that is associated with or keyed to the customer profile. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of preparing and utilizing a customer profile for providing targeted advertisement and information content to a customer in a cable television services system, comprising:

calling an application server at a headend by a content control device for the application server to obtain a customer profile;

passing a query from the application server to a web services system for the web services system to obtain customer data for a customer profile;

collecting by the web services system customer data from one or more data services;

assembling any customer data received from the one or more data services at the web services system;

returning assembled customer data to the application server;

preparing, by the application server, a customer profile from the assembled customer data;

forwarding, by the application server, the customer profile to the content control device;

reviewing the customer profile, at the content control device, for data associated with services subscribed to by the customer to identify a service not subscribed to by the customer;

in response to the identifying by the content control device, retrieving by the content control device a targeted advertisement associated with a service not subscribed to by the customer to offer the customer the service not subscribed to by the customer; and displaying the retrieved targeted advertisement associated with a service not subscribed to by the customer to the customer in an advertisement pane of a displayed menu.

2. The method of claim 1, further comprising:

determining whether information content is associated with the data contained in the customer profile;

retrieving the information content associated with the data contained in the customer profile; and displaying the information content to the customer in a content pane of a displayed menu.

3. A method of preparing a customer profile for targeting content to a customer in a cable television services system, comprising:

requesting by a set-top box associated with a customer television set a customer profile from an application server of a cable television services system;

in response to receiving the request by the application server, calling a web services system for customer data associated with a set-top box upon identification;

in response to receiving the call for customer data at the web services system, calling one or more data services, and requesting customer data associated with the customer from the one or more data services;

at the web services system, assembling any customer data received from the one or more data services and providing the assembled customer data to the application server;

at the application server, preparing a customer profile from the assembled customer data and providing the prepared customer profile to the set-top-box; and storing the customer profile at the set-top box;

analyzing the customer profile by the set-top box to identify a service not subscribed to by the customer; and displaying a targeted advertisement associated with a service not subscribed to by the customer to the customer in an advertisement pane of a displayed menu.

4. The method of claim 3, further comprising:

requesting the customer profile by the set-top box in response to initializing the set-top box.

5. The method of claim 3, further comprising:

requesting the customer profile by the set-top box in response to selecting a customer profile for data refresh.

6. The method of claim 3, whereby requesting the customer profile from an application server includes requesting the customer profile from an application server located at a head end of the cable television services system.

7. The method of claim 6, further comprising:

requesting the customer profile from the application server via a hybrid fiber coax network.

8. The method of claim 3, whereby requesting the customer profile by the set-top box includes querying the application server for a customer profile.

9. The method of claim 3, whereby requesting the customer profile from an application server includes passing the application server a set-top box identification associated with the customer.

10. The method of claim 3, whereby calling a web services system for customer data associated with the set-top box identification includes calling the web services system from the application server.

11. The method of claim 3, prior to assembling the customer data received from the one or more data services, further comprising:

receiving customer data associated with the customer from the one or more data services at the web services system.

12. The method of claim 3, prior to preparing the customer profile from the assembled customer data, passing the assembled customer data from the web services system to the application server.

13. The method of claim 12, prior to storing the customer profile at the set-top box, further comprising:

passing the customer profile to the set-top box via a hybrid fiber coax network.

14. The method of claim 3, further comprising:

in response to the customer profile, providing targeted advertising data to the customer based on the data contained in the customer profile.

15. The method of claim 3, further comprising:

at the set-top box, determining information content associated with the data contained in the customer profile;

retrieving the information content associated with the data contained in the customer profile; and displaying the information content to the customer in a content pane of a displayed menu.

16. In a cable television services network, a system for preparing a customer profile for targeting content to a customer, comprising:

a television set-top box operative to request a customer profile from an application server of a cable television services system for determining content to provide the customer;

the application server operative to call a web services system, in response to receiving the request by the cable television services system application server, for customer data associated with a set-top box upon identification; and the web services system operative, in response to receiving the call for customer data at the web services system, to call one or more data services, and to request customer data associated with the customer from the one or more data services, to assemble any customer data received from the one or more data services, and to pass the assembled customer data to the application server; and the application server further operative wherein the application server prepares the customer profile from the assembled customer data and provides the prepared customer profile to the set-top-box, and wherein the set-top box analyzes the customer profile to identify a service not subscribed to by the customer and displays a targeted advertisement associated with a service not subscribed to by the customer to the customer in an advertisement pane of a displayed menu.

17. The system of claim 16, whereby the television set-top box is further operative to review the customer profile for data associated with services subscribed to by the customer; and to retrieve the targeted advertisement to offer the customer a service not subscribed to by the customer.

18. The system of claim 17, whereby the television set-top box is further operative to determine information content associated with the data contained in the customer profile;

to retrieve the information content associated with the data contained in the customer profile; and to display the information content to the customer in a content pane of a displayed menu.

19. The system of claim 16, whereby the television set-top box is further operative to request the customer profile in response to initializing the set-top box.

20. The system of claim 16, whereby the television set-top box is further operative to request the customer profile if a set amount of time has elapsed since the customer profile has been updated.

\* \* \* \* \*

UNITED STATES PATENT AND TRADEMARK OFFICE
CERTIFICATE OF CORRECTION

| | | |
|---|---|---|
| PATENT NO. | : 7,856,646 B1 | Page 1 of 1 |
| APPLICATION NO. | : 10/885292 | |
| DATED | : December 21, 2010 | |
| INVENTOR(S) | : Groff et al. | |

It is certified that error appears in the above-identified patent and that said Letters Patent is hereby corrected as shown below:

Col. 7, line 30: "advertising Wand targeted content" should read --advertising and targeted content--

Signed and Sealed this
Fifth Day of July, 2011

David J. Kappos
*Director of the United States Patent and Trademark Office*